Nov. 5, 1929.   C. E. JEFFERS   1,734,810
AUTOMOBILE WINDSHIELD HINGE
Filed July 3, 1928

INVENTOR.
Clarence E. Jeffers
BY
ATTORNEYS

Patented Nov. 5, 1929

1,734,810

UNITED STATES PATENT OFFICE

CLARENCE E. JEFFERS, OF YORK, PENNSYLVANIA, ASSIGNOR TO MARTIN-PARRY CORPORATION, OF YORK, PENNSYLVANIA, A CORPORATION OF DELAWARE

AUTOMOBILE WINDSHIELD HINGE

Application filed July 3, 1928. Serial No. 290,074.

This invention relates to automobile windshield hinges.

An object of the invention is to provide a hinge adapted to pivotally connect a windshield to a stationary body.

Another object of the invention is to construct such hinge parts of sheet metal stampings and designed in such a way as to obviate the necessity for the usual pintle.

Another object of the invention is to provide an extremely inexpensive construction which will give a wide range of movement to the windshield without permitting separation thereof from the companion hinge; the parts of the hinge contributing to longevity, rigidity, economy of manufacture and ease of operation and installation.

There are numerous other and subordinate objects of the invention which will be apparent to those skilled in the art from a reading of the following specification in conjunction with the drawings attached hereto and forming a part hereof in which:

Figure 2 is a detailed sectional view, while

Figure 1:
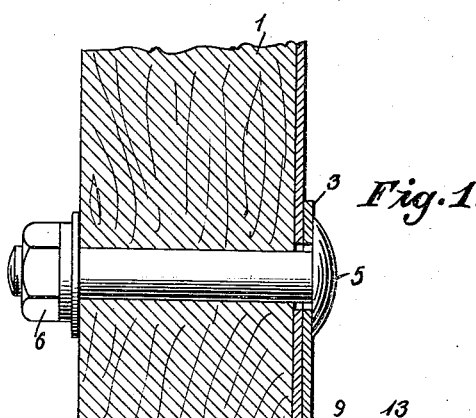
Figure 1 is a sectional view showing the hinge in operative position.
Figure 2:
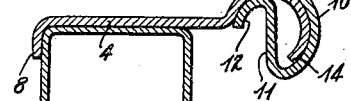
Figure 2:
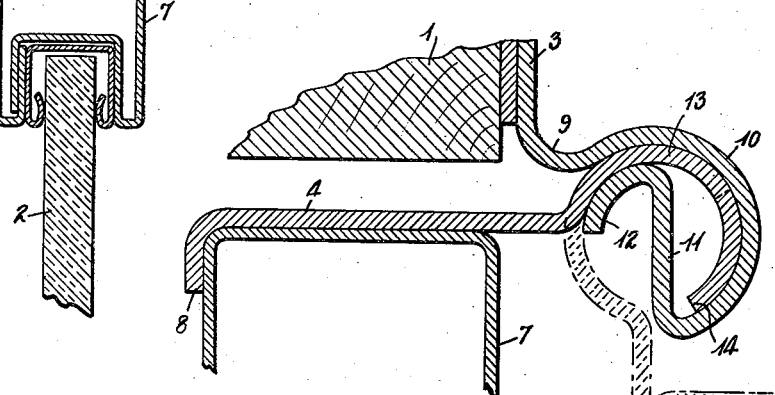
Figure 3:
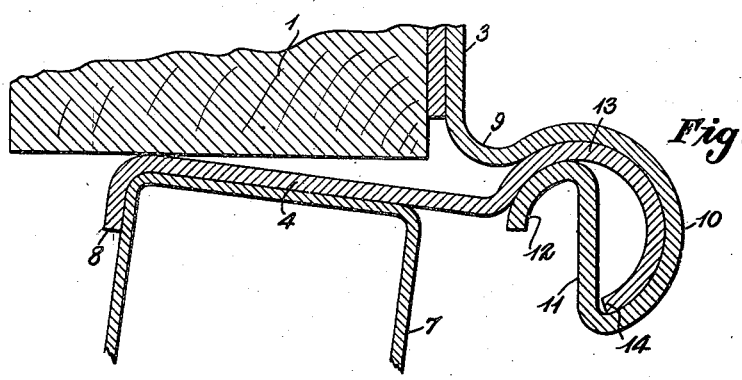
Figure 3 is a similar detailed view showing an extreme inward position of the windshield.

Referring now particularly to the drawings, 1 represents the frame work of an automobile and 2 a swinging windshield therefor. In order to accommodate this swinging movement of the windshield relative to the frame I provide a hinge consisting of two sheet metal stampings or strips 3 and 4. The former extends vertically along the side of the frame and is secured thereto by the bolt 5 and nut therefor 6 or in any other desired manner. The strip 4 on the other end has a horizontally extending portion which is mounted over a tubular windshield frame 7 and has a downturned portion 8. This strip or stamping is spot-welded or otherwise secured to the windshield frame. As shown in the drawings, the strip 3 constituting one of the hinge sections is bent at 9 and extends outwardly in a horizontal direction for a short distance where it is shaped to provide a bead of arcuate shape formation represented by reference numeral 10, which bead extends laterally from the frame work and depends from the portion of the strip secured thereto. The strip is thereafter bent upwardly to provide a vertically disposed portion 11 and a rounded lip 12 constituting a bearing in a manner hereinafter described and conforming in contour to the interior of a cooperating arcuate shaped bead. The lower section or strip attached to the movable object, such as a windshield, is likewise provided with a bead of arcuate shape cross section as designated by reference numeral 13. It will be obvious that the inward turning or pivotal movement of the windshield will be thus limited by engagement of the terminal portion 14 of the bead 13 with the vertically extending portion 11 of the outer concentric bead 10. As shown, the rounded lip 12 conforms in contour to the interior of the arcuate inner bead 13 and resiliently abuts thereagainst and constitutes a bearing for the hinge parts, resulting in a very strong structure and one that will not readily rattle or become rusted.

The beads provided by the hinge sections are preferably of substantially semi-circular formation but, as will be appreciated by those skilled in the art, this exact configuration is not entirely necessary to fulfill the conception underlying the invention and may be varied according to the necessities of the occasion without departing from the spirit of the invention as defined in the following claims.

It will also be apparent that the hinge is capable of uses other than for automobile hinges but the general construction disclosed and claimed peculiarly adapts the same for motor vehicles or the like.

What I claim is:

1. A windshield hinge comprising a stationary hinge section and a movable hinge section, the stationary hinge section having a vertical portion for attachment to the framework of an automobile and having a horizontally extending portion taking the form of a bead of arcuate shape cross section extending laterally and depending from the said framework and the other hinge section adapted to be connected to the windshield having an interfitting beaded portion for permitting swinging movement of the windshield relative to the frame, said stationary hinge section having an upwardly extending web having a bearing at its extremity engaging the interior of the beaded portion for the windshield and constituting a bearing support therefor in the different angular positions of the shield.

2. A windshield hinge of the character described comprising two sections, one adapted for attachment to the framework and the other to the windshield and both of which are provided with interfitting beaded portions, the stationary hinge section having an upwardly extending section terminating in a rounded lip constituting a bearing for engagement with the interior of the beaded section for the windshield, said upwardly extending portion being engageable with the terminal of the windshield hinge section to limit the movement thereof in one direction.

3. A windshield hinge of the character described comprising two hinge sections for attachment to the frame and windshield respectively, the upper of said sections having an outwardly disposed and depending beaded part provided with an integrally upwardly extending portion having a rounded lip extension, the windshield hinge section having a part thereof fitting between the lip extension and the bead respectively of the upper section for permitting swinging movement of the windshield relative to the frame, said rounded lip extension constituting a bearing support for the interior of the windshield hinge section in its different angular positions of adjustment.

4. A windshield hinge of the pintleless type adapted for automobiles and the like comprising two hinged sections each having a bead formed therein for interfitting pivotal engagement, one of the sections being adapted to be applied to one object and another to another object and one of the beaded portions having as a continuation thereof a vertically and upwardly extending flange, when the sections are in their normal operative positions and the supported shield is closed, said vertically and upwardly extending flange having a bearing engaging against the interior of the beaded portion provided by the other said section and affording a support therefor in the different angular positions thereof.

5. A windshield hinge of the character described comprising upper and lower sections each having flanges adapted for engagement to a header and windshield respectively and each having arcuate shaped beaded portions interfittingly arranged in a manner to obviate the necessity for the conventional pintle, the upper of said sections having as a continuation of the beaded portion thereof a vertically and upwardly extending flange having a rounded portion constituting a bearing engaging the concave interior of the beaded portion provided by the lower section and affording support for said other beaded portion in its different angular positions of adjustment, said upper section with the vertically and upwardly extending flange thereof being stationary whereby the lower section rocks around and is supported by the beaded portion in all different angular positions.

In testimony whereof I affix my signature.

CLARENCE E. JEFFERS.